Aug. 8, 1944.  S. BLOOMFIELD  2,355,263
DRILLING UNIT FOR JIGS OR THE LIKE
Filed Aug. 9, 1943   2 Sheets-Sheet 1
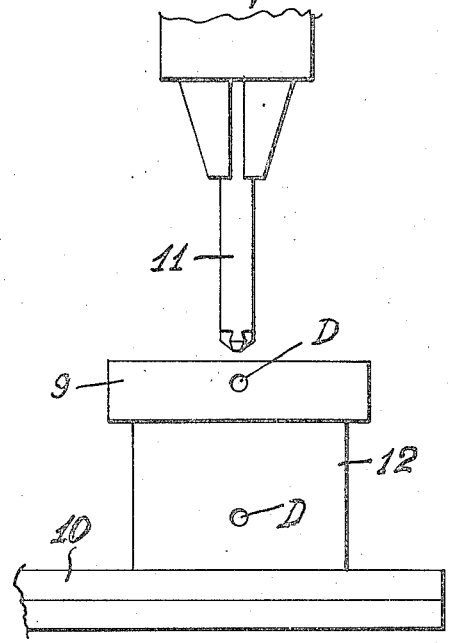
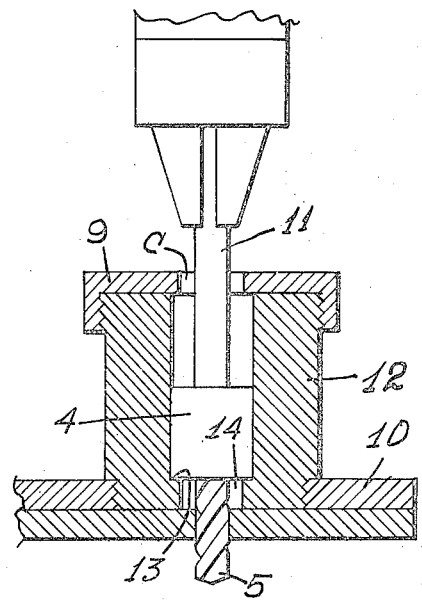
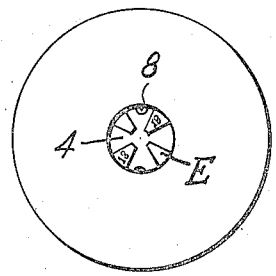
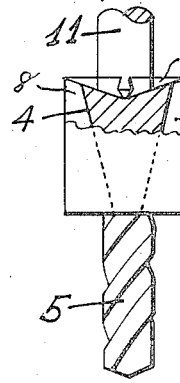
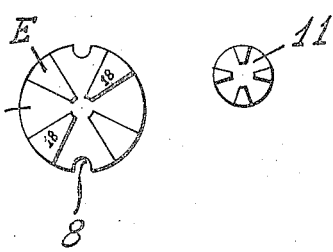
INVENTOR.
SAM BLOOMFIELD Aug. 8, 1944.　　　　S. BLOOMFIELD　　　　2,355,263
DRILLING UNIT FOR JIGS OR THE LIKE
Filed Aug. 9, 1943　　　2 Sheets-Sheet 2

INVENTOR.
SAM BLOOMFIELD
BY C. S. Charles
ATTY.

Patented Aug. 8, 1944

2,355,263

UNITED STATES PATENT OFFICE 2,355,263

DRILLING UNIT FOR JIGS OR THE LIKE

Sam Bloomfield, Wichita, Kans.

Application August 9, 1943, Serial No. 497,955

2 Claims. (Cl. 77—13)

This invention relates to a drilling unit for jigs or the like, and has for its principal object the construction of a unit having a drill bit therein of a selected diameter and means to secure the unit to a jig for the drilling of apertures in spaced relation in work preparatory to assembling the same in structural form, whereby the work, as components of the structures, is secured together by bolts, rivets, or the like engaging in the apertures of two or more parts that are lapped on each other, whereby the drilled apertures must be in registry to receive the said bolts, or rivets to secure the parts together, and in some cases the drilling may vary in diameter, but such variation will not effect the securing means for the unit to the jig, whereby repeated changing of drills in a standard drill press for the same purpose is avoided as each unit contains its respective bit of a predetermined diameter while the drill press is equipped with a turning tool that will operate any and all of the units without changing the tool. The jig consists of a sheet of metal that is drilled to coincide with drilling required for the work whereby each piece of work will be drilled alike as governed by the jig. Of course, the said jig may have means to secure the same in accurate working relation upon each piece of work to insure exact registry of the apertures when the pieces are placed together, and the said units are alike in diameter externally and adapted to engage in apertures that are selectively centered in the jig, and the units being interchangeable.

A further object of this invention is to construct a drilling unit inexpensive to manufacture and efficient in its performance, and each unit being marked externally with respect to the diameter of its drilling bit to avoid mistakes and to speed up the equipment of a jig with the desired units in accordance with details required for the work.

These and other objects will hereinafter be more fully explained, reference being had to the accompanying drawings forming a part of this specification, wherein like characters will apply to like parts in the different views.

Referring to the drawings:

Figs. 1 to 5—A inclusive represent the basic principle of this invention, and in which Fig. 1 is a side view of the unit, the turning tool therefor being disengaged. Fig. 2 is a longitudinal section through the unit bearing, its jig and work also being in section, the drill and its head being in elevation and the turning tool being engaged and has forced the bit through the work. Fig. 3 is a plan view of Fig. 1. Fig. 4 is an enlarged side view of the bit, its head partly in section to illustrate the position of the turning tool. Fig. 5 is an enlarged plan view of the upper end of the bit head, and Fig. 5—A is a view of the engaging end of the turning tool.

Figure 6:
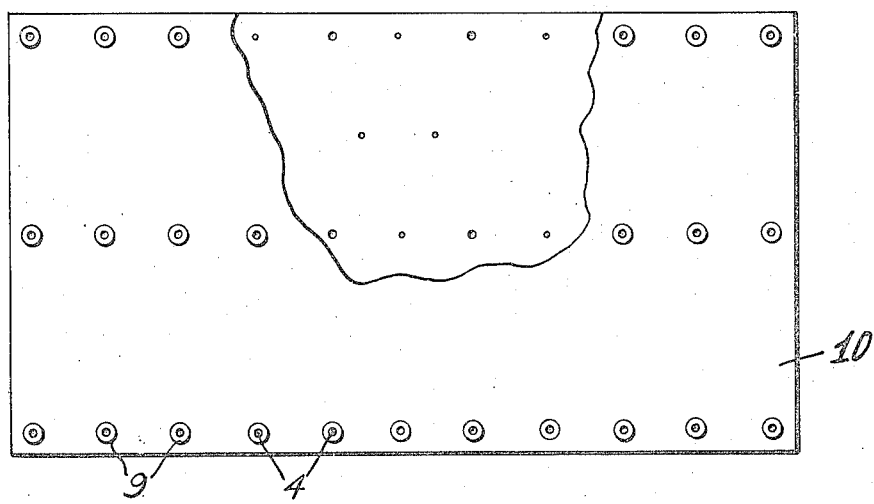
Fig. 6 is a prospective plan view of a jig as applied to work, the jig partly removed to illustrate the possibility of apertures varying in diameter while the units shown on the jig are uniform in diameter.
Figure 7:
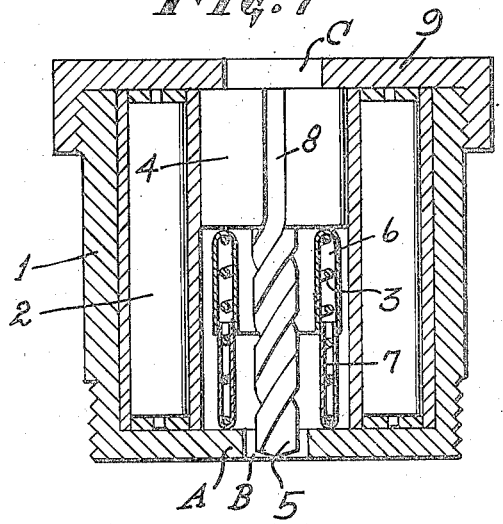
Fig. 7 is a longitudinal section through the unit as modified, the drill bit and head being in elevation.

The components of this invention as modified consist of a tubular casing 1 having a roller bearing 2 mounted therein, and a lifting coil spring 3 placed within the bearing, and a cylindrical head 4 journalled in the said roller bearing and adapted to move vertically therein, said head having a drill bit 5 axial therewith and extending therefrom. Positioned within the inner race of the roller bearing is a lifting coil spring 3, said spring being enclosed by a casing comprised of upper and lower annular members 6 and 7, respectively, said members telescopically engaging to move to and from each other as actuated by the spring and downward movement of the drill bit head with which the upper member engages while the lower member seats on the casing flange, whereby cuttings from the drill bit will be confined within the annular members except those conveyed upward by the drill and outward through the grooves 8 in the head.

As a more concise description of the above named components, it will be seen that the tubular casing has its lower end partially closed by a head A that is axially apertured as at B whereby an annular flange is provided and on which the lower end of said roller bearing seats, while the upper end of the casing is partially closed by a flanged cap 9 that is axially apertured as at C, the flange being threaded internally to engage with an upper end portion of the casing that is threaded externally, and likewise a lower end portion of said casing is threaded as mounting means therefor in a threaded aperture of a jig plate 10. The flange of the cap and body of the casing is externally shallow drilled as at D to be engaged by a spanner wrench to turn the same as tightening or removing means therefor, the said wrench not being shown in the drawings.

It will be seen that the upper end of the cylindrical head is radially dovetail toothed as at E to be engaged by a turning tool 11 that is likewise toothed to coincide with the teeth on the head and the said tool being manually or machine operated to turn the drill bit, it being understood that the said drill in its descent will pass through the aperture of the casing head to contact with the work as drilling means therefor, and the cuttings for some materials that are tough like that of copper, brass, or malleable steel, the same may follow the flutes of the bit and pass outward through the groove 8 in the head, while other materials of a brash nature may accumulate in the space around the bit; in this instance the said guard above described will function to prevent the cuttings from entering between the convolutions of the spring which otherwise would restrict a complete downward movement of the drill bit.

The basic principle of this invention as illustrated in Figs. 1 and 4 consists of a casing 12 axially bored from its upper end to a spaced distance upward from its lower end to form a flange 13 extending inward to function as a stop for the downward movement of the drill head while the drill bit will extend through an opening 14 of a lesser diameter than that of the first said bore in the casing whereby the roller bearings and lifting spring are eliminated, but the cap and threading of the casing is the same and by so constructing the unit excess cost will be eliminated and the unit will function with the same degree of accuracy, as the head will rotate and move through the bore with a smooth running fit, and the said dovetail tooth arrangement as turning means for the drill will function to insure engagement and as lifting means for the drill bit arrangement as the undercut of the dovetailed teeth will cause engagement of the tool with the head to raise the same with the upward movement of the tool, which should continue in its revolutions in either direction.

While I have shown and described a specific way for the disposal of cuttings from the drill bit and a telescopic inclosure for the lifting spring, as well as other specific structural arrangement, the same may be modified without departing from the spirit of the basic principle of this invention as lie within the scope of the appended claims.

Having fully described my invention, what I claim as new and desire to secure by Letters Patent is:

1. In a drilling unit of the class described, a tubular casing of a suitable length and diameter, each end of the casing having an apertured means to engage therewith, the apertures being in registry and axial with the casing, a roller bearing secured in the casing and extending from end to end thereof, a cylindrical head to rotate and slidably engage the entire length of the roller bearing, said cylindrical head having a pair of slots oppositely disposed to each other and extending inward radially from the periphery of the head, said head having a drill bit integrally joined to the head and axially extending therefrom at one end thereof, the drill bit having a pair of spirally wound flutes the upper terminal ends of which are in registry with their respective grooves as conducting means for bit cuttings through the head, a lifting coil spring wound concentric to the bit as lifting means therefor when the bit is released from its downward drilling extremity, a pair of annular casings telescopically engaging to encase the said lifting spring and permit the same to contract and expand, all as and for the purpose specified.

2. In a drilling unit of the class described, in combination with a jig plate having an aperture therethrough, the aperture being internally threaded, a tubular casing having a portion of its length at one end externally threaded to engage in a threaded aperture of a jig plate, said tubular casing adjacent its threaded portion having a head axially apertured, the other end being closed by a cap threadedly engaging thereon, the cap being axially apertured, a roller bearing positioned in the tubular casing and extending from said head to said cap, the roller bearing comprised of inner and outer races with rollers therebetween, a cylindrical head journalled in the inner race of the roller bearing to move with a smooth running fit from the cap downward, said cylindrical head being axially bored to receive the shank of a drill bit firmly therein whereby the drill bit will pass through the aperture of the head as forced by the cylindrical head for the purpose specified.

SAM BLOOMFIELD.